United States Patent [19]
Banholzer et al.

[11] Patent Number: 5,111,698
[45] Date of Patent: May 12, 1992

[54] DIFFERENTIAL PRESSURE MEASURING APPARATUS

[75] Inventors: Karlheinz Banholzer, Schopfheim; Peter Gerst, Karlsruhe; Peter Jung, Steinen, all of Fed. Rep. of Germany

[73] Assignee: Endress u. Hauser GmbH u. Co., Fed. Rep. of Germany

[21] Appl. No.: 741,181

[22] Filed: Jul. 29, 1991

Related U.S. Application Data

[63] Continuation of Ser. No. 591,388, Oct. 1, 1990, abandoned.

[30] Foreign Application Priority Data

Oct. 6, 1989 [DE] Fed. Rep. of Germany ....... 3933512

[51] Int. Cl.$^5$ .................. G01L 9/12; G01L 13/02; G01L 19/04
[52] U.S. Cl. .................... 73/708; 73/718; 361/283
[58] Field of Search ............ 73/708, 718, 724; 361/283; 29/25.41

[56] References Cited

U.S. PATENT DOCUMENTS

| | | | |
|---|---|---|---|
| 3,646,538 | 2/1972 | Frick | 340/200 |
| 3,715,638 | 2/1973 | Polye | 317/247 |
| 3,783,374 | 1/1974 | Eide et al. | 324/60 C |
| 4,072,057 | 2/1978 | Yasuhara et al. | 73/718 |
| 4,169,389 | 10/1979 | Yasuhara et al. | 73/718 |
| 4,177,496 | 12/1979 | Bell et al. | 361/283 |
| 4,398,194 | 8/1983 | Johnston | 340/870.37 |
| 4,531,415 | 7/1985 | Orlowski et al. | 73/718 |
| 4,572,000 | 2/1986 | Koolman | 73/718 |
| 4,598,381 | 7/1986 | Cucci | 73/718 |
| 4,680,971 | 7/1987 | Kavli et al. | 73/718 |
| 4,735,098 | 4/1988 | Kavli et al. | 73/718 |

FOREIGN PATENT DOCUMENTS

| | | |
|---|---|---|
| 2052520 | 4/1971 | Fed. Rep. of Germany . |
| 2021479 | 11/1971 | Fed. Rep. of Germany . |
| 2221062 | 11/1972 | Fed. Rep. of Germany . |
| 2364027 | 7/1975 | Fed. Rep. of Germany . |
| 2709945 | 9/1977 | Fed. Rep. of Germany . |
| 3238430 | 4/1984 | Fed. Rep. of Germany . |
| 3321580 | 12/1984 | Fed. Rep. of Germany . |
| 3504329 | 8/1986 | Fed. Rep. of Germany . |
| 3827138 | 2/1989 | Fed. Rep. of Germany . |
| 0130054 | 10/1979 | Japan .................... 73/708 |
| WO85/04474 | 10/1985 | PCT Int'l Appl. . |

Primary Examiner—Donald O. Woodiel
Attorney, Agent, or Firm—Barnes & Thornburg

[57] ABSTRACT

The differential pressure measuring apparatus comprises a single chamber differential pressure sensor having two resilient sensor diaphragms which enclose a volume filled with a fluid. In the single chamber differential pressure sensor two measuring capacitors are formed whose capacitances vary in opposite senses in response to the sensor differential pressure between the pressures acting on the two sensor diaphragms. The single chamber differential pressure sensor is connected to an adaptor comprising a volume filled with a fluid which is closed on the one hand by one of the two sensor diaphragms and on the other hand by an elastic adaptor diaphragm. An evaluation circuit calculates the sensor differential pressure from the capacitances of the measuring capacitors. The evaluation circuit comprises a first compensation arrangment which compensates the influences of the sensor temperature and of the sensor parameters on the calculated sensor differential pressure, and a second compensation arrangement which compensates the influences of the adaptor temperature and of the adaptor parameters on the sensor differential pressure corrected by the first compensation arrangement.

3 Claims, 1 Drawing Sheet

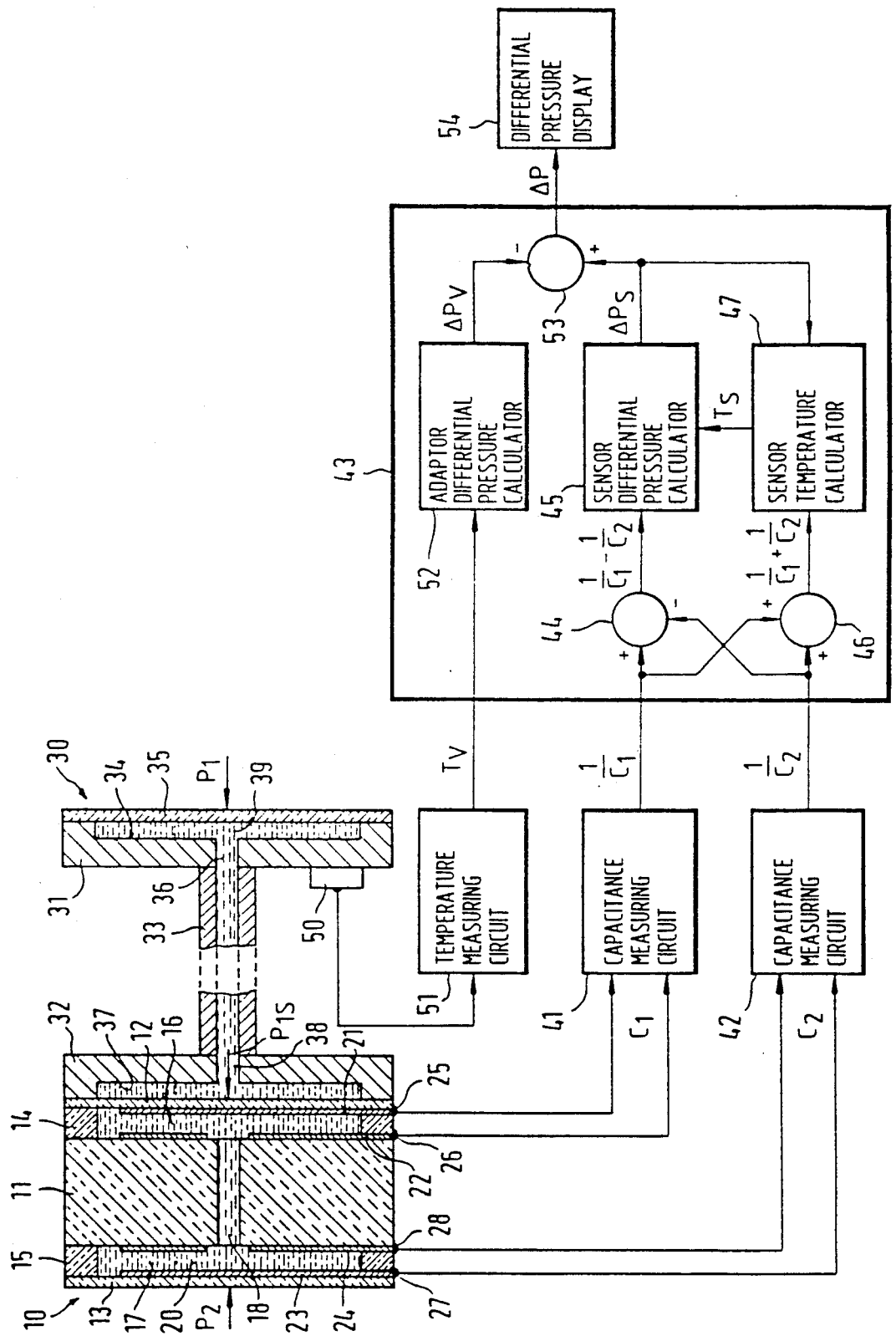

DIFFERENTIAL PRESSURE MEASURING APPARATUS

This application is a continuation of application Ser. No. 07/591,388, filed Oct. 1, 1990, abandoned.

The present invention relates to a differential pressure measuring apparatus comprising a single chamber differential pressure sensor, which comprises two resilient sensor diaphragms enclosing a volume filled with a fluid, and in which two measuring capacitors are formed, whose capacitances vary in opposite senses as a function of the sensor differential pressure which results from the pressures acting on the two sensor diaphragms, and further comprising an evaluation circuit which calculates the sensor differential pressure from the capacitances of the measuring capacitors and comprises a first compensation arrangement which compensates the influences of the sensor temperature and of sensor parameters on the calculated sensor differential pressure.

A differential pressure measuring apparatus of this kind is known from German Patent 35 04 329. In this known differential pressure measuring apparatus is used the fact that the sensor differential pressure is approximately proportional to the difference of the reciprocals of the capacitance values of the two measuring capacitors and the sensor temperature is approximately proportional to the sum of the reciprocals of the capacitance values. In this patent document are also given the relationships which exist between the capacitance values, the sensor parameters and the sensor differential pressure or the sensor temperature. The sensor parameters, which relate for example to the shift of the zero point due to manufacturing tolerances, to the temperature dependence of different quantities, to the sensitivity of the sensor etc., are ascertained by measurement and stored. The compensation arrangement corrects the calculated sensor differential pressure with the help of the stored parameters as well as with the help of the determined sensor temperature, which is in turn corrected with the help of the calculated sensor differential pressure, until a measurement result for the sensor differential pressure is obtained which is independent of influences of the sensor temperature and the sensor parameters.

There are fields of application in which it is not desired or even impossible to let one of the two pressures to be compared act directly on the corresponding sensor diaphragm. This is for example the case when the medium in which the pressure prevails is chemically aggressive or has such a high temperature that it would damage the sensor diaphragm, when the latter were in direct contact with this medium. In other cases the single chamber differential pressure sensor cannot be mounted directly at the place where the pressure is to be sensed, because this is not permitted by the conditions prevailing at this place. In order to permit the measurement of the differential pressure in such cases, the single chamber differential pressure sensor is connected to an adaptor, which comprises a volume filled with a fluid, this volume being closed on the one hand by one of the two sensor diaphragms and on the other hand by an resilient adaptor diaphragm. The medium whose pressure is to be compared acts thus on the adaptor diaphragm, and the pressure exerted on the adaptor diaphragm is transmitted through the fluid to the sensor diaphragm coupled therewith. In the case of a chemically aggressive medium, it is then possible to make the adaptor diaphragm from a material which will not be attacked by the medium. Further, the single chamber differential pressure sensor can be mounted at a favourable place distant from the place at which the pressure is to be sensed and coupled by means of a tube filled with the fluid to the adaptor diaphragm mounted at the place at which the pressure is to be sensed. The differential pressure to be measured corresponds then to the difference between the pressure acting on the adaptor diaphragm and the pressure which acts on the sensor diaphragm remote from the adaptor. In some cases it may also be necessary to arrange an adaptor on each side of the single chamber differential pressure sensor.

The use of such an adaptor with a differential pressure measuring apparatus of the kind mentioned at the beginning would however, deliver a correct measurement result if the pressure acting on the sensor diaphragm related to the adaptor was always exactly equal to the pressure acting on the adaptor diaphragm. As a rule this is, however, not the case since an adaptor differential pressure is generated notably as a result of temperature-dependent volume variations of the fluid contained in the adaptor, by which the pressure acting on the sensor diaphragm differs from the pressure acting on the adaptor diaphragm. This adaptor differential pressure depends on the one hand on the temperature of the adaptor, which is often different from the sensor temperature, and on the other hand on parameters depending on the construction of the adaptor. As a result of these influences the sensor differential pressure calculated and corrected by means of the first compensation arrangement differs from the differential pressure to be measured.

An object of the invention is to provide a differential pressure measuring apparatus of the kind mentioned at the beginning, which delivers correct measuring results also when an adaptor connected with the single chamber differential pressure sensor is used.

According to the invention this object is achieved in that the evaluation circuit comprises a further compensation arrangement for each adaptor which compensates the influences of the adaptor temperature and of adaptor parameters on the sensor differential pressure corrected by the first compensation arrangement.

In the differential pressure measuring apparatus according to the invention, the compensation of the influences of the sensor temperature and of sensor parameters effected by the first compensation arrangement is followed by a second compensation by which the influence of the temperature and the parameters of the adptor on the calculated differential pressure is compensated. Although the capacitance values, from which the differential pressure is calculated, remain determined only by the sensor differential pressure, the second compensation has the effect that the corrected calculated differential pressure corresponds exactly to the differential pressure to be measured. The accomplishment of the compensation in two steps provides the advantage that the first compensation can be the known compensation without modification as it is valid for the single chamber differential pressure sensor without adaptor. The sensor parameters necessary for the first compensation can therefore be detected and stored for the single chamber differential pressure sensor without considering whether it will be later used with an adaptor or not. The parameters necessary for the second compensation can differ according to the type of the adaptor used, the installation conditions, etc.; they can be ascertained and stored on a case by case basis.

Further features and advantages of the invention will become apparent from the following description of an example of embodiment, which is schematically illustrated in the sole figure of the drawings.

The differential pressure measuring apparatus illustrated in the drawing comprises a single chamber differential pressure sensor 10 of a known type. The single chamber differential pressure sensor 10 has a cylindrical base body 11 and two resilient diaphragms 12 and 13 which are mounted in a pressure-tight manner at either end faces of the base body by means of inserted, circumferentially extending spacing rings 14 and 15, respectively. The base body 11 and the diaphragms 12, 13 are made of an electrically insulating material, preferably a metal oxide ceramic. The spacing rings 14 and 15 are also preferably made of an electrically insulating material which ensures the pressure-tight connection between the base body 11 and the diaphragms 12 and 13, for example glass frit. The spacing rings 14, 15 maintain the diaphragms 12, 13 spaced from the base body 11, such that a generally flat cavity 16 and 17, respectively, is formed between each diaphragm 12, 13 and the opposite face of the base body 11. The two cavities 16 and 17 communicate with each other via an axial passage 18 provided in the base body 11, to thereby form a common chamber which is tightly isolated from the exterior. The entire volume of the chamber is filled with an incompressible insulating fluid 20, for example silicone oil.

The inner face of the diaphragm 12 which faces the base body 11 is coated with a film electrode 21 which faces an annular film electrode 22 provided on the opposite end face of the base body 11. In the same manner, the inner face of the diaphragm 13 is coated with a film electrode 23 which faces an annular film electrode 24 provided on the opposite end face of the base body 11. The film electrodes 21, 22, 23, 24 are connected to terminals 25, 26, 27, 28 accessible from the exterior, for example by means of film conducting strips which are applied jointly with the corresponding film electrodes 21 to 24 by thick film technology and extend to the exterior between the spacing rings 14, 15 and the base body 11 or the diaphragms 12, 13, respectively.

The film electrode 21 and the opposite film electrode 22 form a first measuring capacitor whose capacitance $C_1$ can be measured between the terminals 25 and 26, and the film electrode 23 and its oppositely facing film electrode 24 form a second measuring capacitor whose capacitance $C_2$ can be measured between the terminals 27 and 28.

In most cases, a single chamber differential pressure sensor of the type illustrated is used to measure the differential pressure between two pressures which act directly on the two diaphragms 12 and 13. When these two pressures are not equal, the two diaphragms 12 and 13 coupled by means of the non-compressible fluid are displaced in the direction of the greater pressure, whereby the distances between the film electrodes 21, 22 on the one hand and between the film electrodes 23, 24 on the other hand and therefore also the capacitances $C_1$ and $C_2$ of the two measuring capacitors vary in opposite senses. The differential pressure can then be determined by measurement of the capacitances $C_1$ and $C_2$. However, in many applications it is not desired or even impossible to let one of the two pressures to be compared act directly on the corresponding diaphragm of the single chamber differential pressure sensor. This is for example the case when the medium which exerts the pressure would damage the diaphragm, for example because it is chemically aggressive, or when the environment conditions at the place at which the pressure is to be sensed do not permit the installation of the single chamber differential pressure sensor in direct contact with the medium.

In order to permit the measurement of the differential pressure also under such conditions, the single chamber differential pressure sensor 10 is connected to an adaptor 30 on its side carrying the diaphragm 12. The adaptor 30 comprises two housing shells 31, 32, which are connected to each other via a narrow tube 33. The housing shell 31 is provided with a flat recess 34 which is covered by a diaphragm 35, tightly connected with the edge of the housing shell around its periphery. Accordingly, the recess 34 forms a flat cavity sealed to the exterior, which communicates with the interior of the tube 33 via a center opening 36 provided in the housing shell 31. The housing shell 32 is provided with a flat recess 37 and is tightly connected around its periphery with the single chamber differential pressure sensor 10, such that the flat recess 37 is covered by the diaphragm 12. Accordingly, the flat recess 37 forms a flat cavity sealed in a pressure-tight manner with respect to the single chamber differential pressure sensor 10, this cavity communicating with the interior of the tube 33 via a center opening 38 provided in the housing shell 32. In this manner, the two cavities 34 and 37 communicate with each other through the tube 33. The entire volume isolated from the exterior of the two flat cavities 34 and 37 and of the tube 33 is filled with an incompressible fluid 39, which can be of the same type as the fluid 20 contained in the single chamber differential pressure sensor 10, for example silicone oil. The adaptor 30 is so designed that this volume is as small as possible and/or optimized with respect to the single chamber differential pressure sensor or to the conditions of application.

The single chamber differential pressure sensor 10 provided with the adaptor 30 is installed in such a manner that instead of the diaphragm 12, the diaphragm 35 is in contact with the medium whose pressure $P_1$ is to be compared with the pressure $P_2$ acting on the diaphragm 13. In case this medium has such properties that it would attack the diaphragm 12, the diaphragm 35 is made of a material which cannot be attacked by the medium. When the conditions at the place at which the pressure is to be sensed are such that the installation of the single chamber differential pressure sensor 10 is not possible, it is only necessary to mount the housing shell 31 of the diaphragm 35 at the place at which the pressure is to be sensed, whereas the single chamber differential pressure sensor 10 is arranged at an advantageous place distant therefrom and connected with the housing shell 31 by means of the tube 33, which can be of an important length. In any case, the pressure $P_1$ acting on the diaphragm 35 is transmitted to the diaphragm 12 through the incompressible fluid 39, whereby a pressure $P_{1S}$ acts on the diaphragm 12, which pressure is not necessarily equal to the pressure $P_1$ as it will be later explained.

The mode of operation of the single chamber differential pressure sensor 10 is known. It is based on the fact that the capacitances $C_1$ and $C_2$ of the two measuring capacitors depend on the sensor differential pressure $\Delta P_S$, which exists between the pressures acting on the diaphragms 12 and 13:

$$\Delta P_S = P_{1S} - P_2 \qquad (1)$$

When the two pressures $P_{1S}$ and $P_2$ are equal, such that the differential pressure $\Delta P_S$ is zero, the differential pressure sensor 10 is in a balanced condition, in which the capacitances $C_1$ and $C_2$ of the two measuring capacitors are equal, assuming that the construction is fully symmetrical without manufacturing tolerances. Owing to the incompressible fluid 20, which fills the entire volume between the two diaphragms 12 and 13, the diaphragms cannot actually be displaced under the action of the pressures $P_{1S}$ and $P_2$ acting thereon when these pressures are equal. However, when for example pressure $P_{1S}$ is higher than pressure $P_2$, it can displace the diaphragm 12 towards the base body 11 and a portion of the incompressible fluid 20 is transferred from the cavity 16 to the cavity 17 via the passage 18, such that the diaphragm 13 is displaced away from the base body 11 towards the exterior against the pressure $P_2$. As a result of the displacements of the two diaphragms 12 and 13, the distance between the film electrodes 21 and 22 is reduced and the distance between the film electrodes 23 and 24 is increased. Correspondingly, the capacitance $C_1$ is increased and the capacitance $C_2$ is decreased. The pressure differential $\Delta P_S$ can hence be determined by measurement of the two capacitances $C_1$ and $C_2$. Neglecting non-linearities and the influence of perturbation quantities the differential pressure $\Delta P_S$ is approximatively proportional to the difference between the reciprocals of the capacitances:

$$\Delta P_S = k_P \cdot \left( \frac{1}{C_1} - \frac{1}{C_2} \right) \qquad (2)$$

A significant perturbation quantity which influences the measurement of the differential pressure is the temperature, since the capacitances $C_1$ and $C_2$ of the two measurement capacitors also depend on the sensor temperature $T_S$ in addition to the sensor differential pressure $\Delta P_S$. In fact, when the temperature is varied the volume of the fluid 20 trapped between the two diaphragms 12 and 13 is also varied. When the volume of the fluid 20 increases as a result of a temperature increase the two diaphragms 12 and 13 are displaced towards the exterior such the distances between the film electrodes 21 and 22 on the one hand and between the film electrodes 23 and 24 on the other hand increase simultaneously. Correspondingly, the capacitances $C_1$ and $C_2$ decrease simultaneously. Conversely, following a temperature decrease, the two capacitances $C_1$ and $C_2$ increase simultaneously as a result of a decrease of the volume of the fluid. The temperature variation is approximately proportional to the sum of the reciprocals of the capacitance values:

$$\Delta T_S = k_T \cdot \left( \frac{1}{C_1} + \frac{1}{C_2} \right) \qquad (3)$$

Owing to this fact, it is possible to determine the temperature $T_S$ of the single chamber differential pressure sensor 10 from the measured capacitances $C_1$ and $C_2$ and to use it in order to compensate for the temperature dependence of the sensor differential pressure $\Delta P_S$. This is ensured by means of the evaluation circuit of the differential pressure measuring apparatus illustrated in the drawing and described hereafter.

The evaluation circuit comprises a first capacitance measuring circuit 41 connected to the terminals 25, 26 for measurement of the capacitance $C_1$, and a second capacitance measuring circuit 42 connected to the terminals 27, 28 for measurement of the capacitance $C_2$. Each capacitance measuring circuit is so designed as to deliver at its output a measurement signal which is proportional to the reciprocal value of the measured capacitance. Thus, the capacitance measuring circuit 41 delivers a measurement signal proportional to $1/C_1$, and the capacitance measuring circuit 42 delivers a measurement signal proportional to $1/C_2$.

The measurement signals delivered by the two capacitance measuring circuits 41 and 42 are supplied to a calculation circuit 43, which calculates the sensor differential pressure $\Delta P_S$ from these signals. This is illustrated in the drawing by showing that the calculation circuit 43 comprises a substracting circuit 44, which receives the measurement signals from the two capacitance measuring circuits 41 and 42, and delivers at its output a signal which is proportional to the difference between the reciprocals of the capacitance values: $1/C_1 - 1/C_2$. This signal is supplied to a sensor differential pressure calculator 45.

It is further shown that the calculation circuit 43 comprises a summation circuit 46 which also receives the measurement signals from the two capacitance measuring circuits 41 and 42 and delivers at its output a signal which is proportional to the sum of the reciprocals of the capacitance values: $1/C_1 + 1/C_2$. This signal is supplied to a sensor temperature calculator 47 which calculates therefrom the sensor temperature $T_S$ of the single chamber differential pressure sensor 10. This temperature $T_S$ is also supplied in the sensor differential pressure calculator 45.

The calculation of the sensor temperature $T_S$ in the sensor temperature calculator 47 and the calculation of the sensor differential pressure $\Delta P_S$ in the sensor differential pressure calculator 45 is effected in such a manner that the influences of the sensor temperature and of other sensor parameters on the sensor differential pressure are compensated, such that the sensor differential pressure $\Delta P_S$ calculated by the sensor differential pressure calculator 45 corresponds exactly to the difference between the pressures $P_{1S}$ and $P_2$ acting on the sensor diaphragms 12 and 13. According to a method known from German Patent 35 04 329, this can be for example effected by calculating the sensor temperature $T_S$ and the sensor differential pressure $\Delta P_S$ from the following equations:

$$\frac{1}{C_1} + \frac{1}{C_2} = a + b \cdot T_S + c \cdot T_S^2 + d \cdot \Delta P_S + e \cdot \Delta P_S^2 \qquad (4)$$

$$\frac{1}{C_1} - \frac{1}{C_2} = f + g \cdot T_S + h \cdot T_S^2 + i \cdot \Delta P_S + k \cdot \qquad (5)$$

$$\Delta P_S^2 + 1 \cdot \Delta P_S \cdot T_S + m \cdot \Delta P_S \cdot T_S^2$$

wherein:

a, f are values which correspond to the zero shift of the measurement values due to manufacturing tolerances of the single chamber differential pressure sensor;

b, c are values which correspond to the sensitivity for the temperature detection, which depend from the volume variation of the filling fluid caused by temperature variation;

d, e are values which depend from the dissymmetry of the sensor due to manufacturing conditions;

g, h are values which correspond to the temperature dependence of the zero shift due to manufacturing conditions;

i, k are values which depend from the spring constants of the diaphragms 12 and 13, which determine the sensitivity of the single chamber differential pressure sensor;

l, m are values which correspond to the temperature dependence of the spring constants of the diaphragms 12 and 13.

The parameters a to m can be ascertained by measurement in a generally known manner and are stored in the calculation circuit 43.

Since the equations (4) and (5) cannot be solved with respect to $T_S$ and $\Delta P_S$, the calculation must be effected according to a recursive process. In this process each calculated sensor differential pressure $\Delta P_S$ must be returned to the sensor temperature calculator 47 as indicated in the drawing by a connection from the output of the sensor differential pressure calculator 45 to a second input of the sensor temperature calculator 47.

When the single chamber differential pressure sensor 10 is used without the adaptor 30, as it is often the case, the sensor differential pressure $\Delta P_S$ supplied by the portion of the evaluation circuit described heretofore already represents the desired measurement result. When the adaptor 30 is used, the sensor differential pressure $\Delta P_S$ would also correspond to the differential pressure $\Delta P$ to be measured, if the pressure $P_{1S}$ acting on the sensor diaphragm 12 was exactly equal to the pressure $P_1$ acting on the adaptor diaphragm 35. This is, however, not usually the case. For example, in case of a temperature increase the volume of the incompressible fluid 39 trapped in the adaptor 30 increases, whereby an additional pressure develops in the adaptor, by which the pressure $P_{1S}$ is higher than the pressure $P_1$. The adaptor differential pressure $$\Delta P_1 = P_{1S} - P_1 \qquad (6)$$

depends primarily on the adaptor temperature of the adaptor $T_S$ as well as on parameters due to the construction of the adaptor 30.

The evaluation circuit illustrated in the drawing is therefore so designed that the influence of the adaptor temperature and other adaptor parameters on the differential pressure $\Delta P$ to be measured can be compensated.

A temperature sensor 50 is affixed to the adaptor 30 in such a manner that the temperature measured thereby corresponds essentially to the temperature of the incompressible fluid 39 contained in the adaptor. The temperature sensor 50 can be any temperature sensor known per se, for example a temperature-dependent resistor of the type PT 100. If necessary, several temperature sensors like the temperature sensor 50 can be affixed to the adaptor.

A temperature measuring circuit 51 is connected to the temperature sensor 50 and delivers at its output a measurement signal which corresponds to the adaptor temperature $T_1$ detected by the temperature sensor 50. This measurement signal is supplied to an adaptor differential pressure calculator 52, contained in the calculation circuit 43, which calculates the adaptor differential pressure $\Delta P_1$ for example from the following equation:

$$\Delta P_1 = p - q \cdot T_1 \qquad (7)$$

wherein p and q are parameters of the adaptor, which are ascertained by measurement in a manner similar to the parameters a to m of the single chamber differential pressure sensor 10, and are stored in the calculation circuit 43. To these parameters pertain notably the thermal expansion coefficient of the incompressible fluid contained in the adaptor.

The adaptor differential pressure $\Delta P_1$ calculated by the adaptor differential pressure calculator 52 is supplied to a subtracting circuit 53 which also receives the sensor differential pressure $\Delta P_S$ calculated by the sensor differential pressure calculator 45 and delivers at its output a signal which corresponds to the difference between the two input values:

$$\Delta P = \Delta P_S - \Delta P_1. \qquad (8)$$

This signal corresponds exactly to the differential pressure $\Delta P$ to be measured between the pressure $P_1$ acting on the adaptor diaphragm 35 and the pressure $P_2$ acting on the sensor diaphragm 13, and all temperature influences in the adaptor and in the sensor as well as the influences of parameters linked to the construction of the adaptor and the sensor are compensated. The differential pressure $\Delta P$ can be displayed in a differential pressure display 54 connected to the output of the subtracting circuit 53.

It can be seen that the compensation in the calculation circuit 43 is effected in two steps. The sensor temperature calculator 47 and the sensor differential pressure calculator 45 form a first compensation arrangement which compensates the influences of the sensor temperature and the sensor parameters. This first compensation arrangement corresponds to the state of the art in connection with single chamber differential pressure sensors which are used without adaptors. To this first compensation arrangement is linked a second compensation arrangement which is formed by the adaptor differential pressure calculator 52 and the subtracting circuit 53. This second compensation arrangement compensates the additional influences of the adaptor temperature and the adaptor parameters on the sensor differential pressure calculated with the help of the first compensation arrangement.

The splitting of the compensation in two steps provides the important advantage that the first compensation corresponds to the usual compensation of a single chamber differential pressure sensor and depends in no way on the fact whether an adaptor is additionally used or not. The parameters necessary for the first compensation can therefore be determined for the single chamber differential pressure sensor and stored in the calculation circuit 43 without taking into account whether an adaptor will later be used and how this adaptor is designed and installed. The parameters necessary for the second compensation, which can be different according to the type of the adaptor used and the installation conditions, are separately ascertaineed on a case by case basis and stored in the calculation circuit 43.

The calculation circuit 43 can be designed in any manner known per se, for example by means of known analog or digital circuits. Advantageously the calculation circuit is embodied in a suitably programmed microprocessor. In case the measurement signals delivered by the capacitance measuring circuits 41 and 42 are not in a format suitable for direct processing in a microprocessor, the necessary analog-to-digital converters or other interfaces must be inserted, as it is familiar to the man skilled in the art.

The temperature sensor 50 and the temperature measuring circuit 51 can be omitted if it is certain that the adaptor temperature $T_1$ is always exactly equal to the sensor temperature $T_S$. In this case the sensor temperature $T_S$ calculated by the sensor temperature calculator 47 will also be supplied to the adaptor differential pressure calculator 52. In the majority of cases this condition is, however, not fulfilled, so that it is preferable to detect the adaptor temperature $T_1$ separately.

In some fields of application it may be necessary to arrange a second adaptor of the type of the adaptor 30 or the other side of the single chamber differential pressure sensor 10, for example for protecting also the diaphragm 13 from the action of a chemically aggressive medium. The differential pressure to be measured corresponds then to the difference between the pressures which act on the two adaptor diaphragms. The differential pressure measuring apparatus described heretofor can in this case be simply extended: a second adaptor differential pressure calculator will be provided in the calculation circuit 43, to calculate the adaptor differential pressure of the second adaptor in the manner described, and the sum of the two adaptor differential pressures will be subtracted from the sensor differential pressure in the subtracting circuit 53. The adaptor temperature of the second adaptor can again be determined with the help of one or several temperature sensors and a temperature measuring circuit connected thereto.

We claim:

1. Differential pressure measuring apparatus comprising a single chamber differential pressure sensor which comprises two resilient sensor diaphragms enclosing a volume filled with a fluid and in which two measuring capacitors are formed whose capacitances vary in opposite senses as a function of the sensor differential pressure which results from the pressures acting on the two sensor diaphragms, and further comprising an evaluation circuit which calculates the sensor differential pressure from the capacitances of the measuring capacitors and comprises a first compensation arrangement which compensates the influences of the sensor temperature and of sensor parameters on the calculated sensor differential pressure, the single chamber differential pressure sensor being connected with at least one adaptor comprising a volume filled with a fluid, which is closed on the one hand by one of the two sensor diaphragms and on the other hand by a resilient adaptor diaphragm, and the evaluation circuit comprising a further compensation arrangement for each adaptor, which compensates the influences of the adaptor temperature and of adaptor parameters on the sensor differential pressure corrected by the first compensation arrangement.

2. Differential pressure measuring apparatus according to claim 1, wherein each further compensation arrangement comprises an adaptor differential pressure calculator which calculates the adaptor differential pressure from the adaptor temperature and from stored adaptor parameters, and a subtracting circuit which forms the difference between the sensor differential pressure corrected by the first compensation arrangement and the calculated adaptor differential pressure and delivers this difference as the measurement result.

3. Differential pressure measuring apparatus according to claim 2, wherein at least one temperature sensor is affixed to each adaptor for measuring the adaptor temperature, and each temperature sensor is connected to a temperature measuring circuit which delivers to the adaptor differential pressure calculator a measurement signal representative of the adaptor temperature.

* * * * *